Patented Sept. 2, 1930

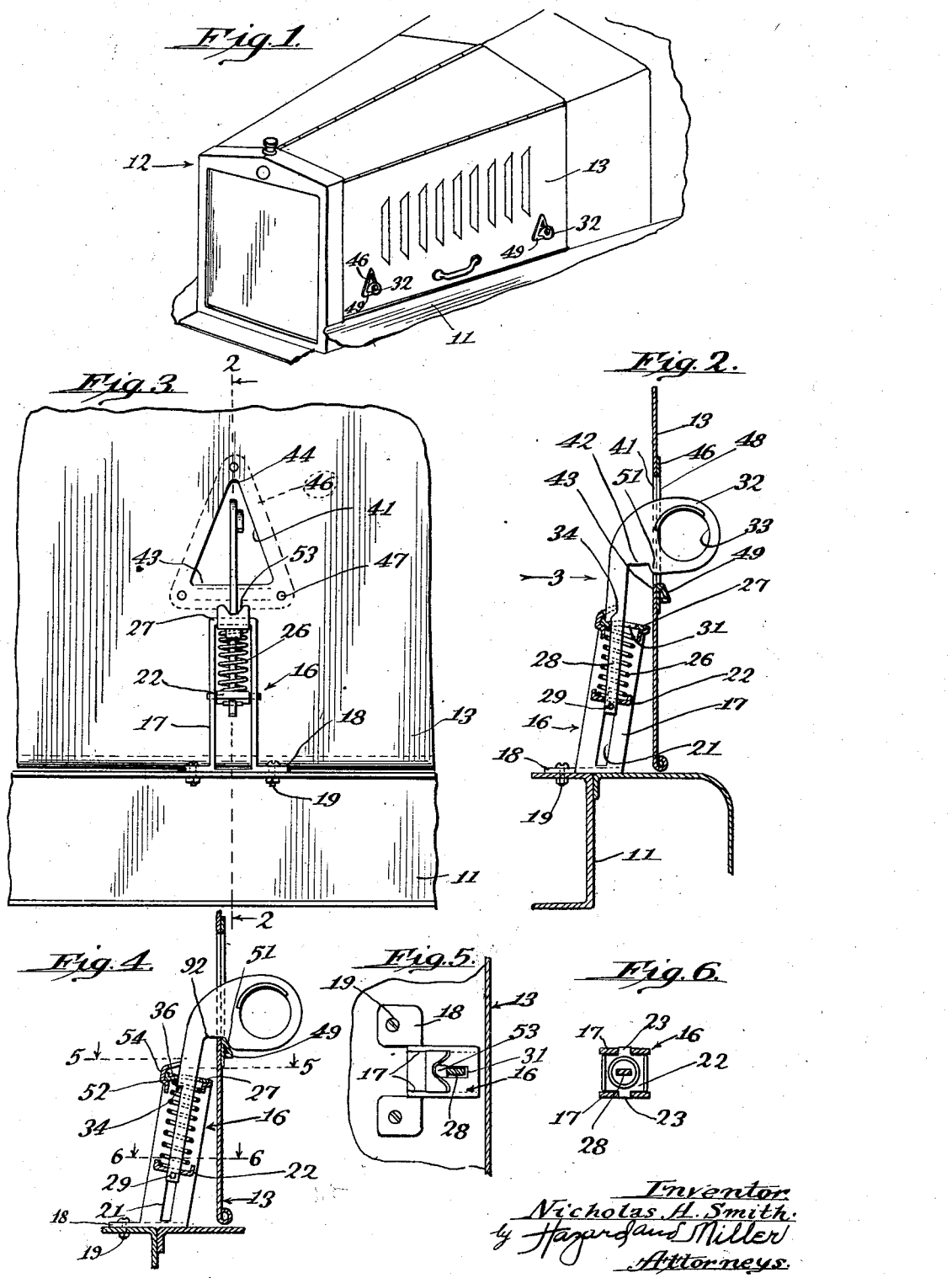

1,775,002

UNITED STATES PATENT OFFICE

NICHOLAS A. SMITH, OF ALTADENA, CALIFORNIA

HOOD LATCH

Application filed January 26, 1929. Serial No. 335,290.

This invention relates to catches, and more especially to a catch for releasably holding the engine hood of an automobile in closed position.

An object of the invention is the provision of a catch especially adapted for use in holding the engine hood of an automobile closed, this catch being so designed that it is disposed upon the interior of the hood and thus concealed from view when the hood is closed. The latch however, is provided with means operable from the exterior of the hood, for optionally releasing or engaging it with the hood.

Another object is the provision of a hood latch as described, in which the operating means is in the form of a finger grip extending through an aperture in the hood, and which requires only that it be lifted to move the catch to releasing position, the catch being provided with means for retaining the bolt thereof out of engagement with the hood, so that the hood may be drawn away from the catch, and then raised to permit access to the interior of the hood.

A still further object is the provision of a catch of the general class described, which is of a simple and inexpensive nature, practically all the parts thereof being conveniently made from die cut stampings, which is capable of efficient operation, and which is adapted to securely hold the hood in closed position to prevent vibration and rattling thereof.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a perspective view of the radiator and engine hood of an automobile, the hood being releasably held closed by catches incorporating the features of my invention.

Fig. 2 is an enlarged, vertical sectional view taken through the hood and catch, and showing the catch in released position. The plane of section is indicated by the line 2—2 of Fig. 3, and the direction of view by the arrows.

Fig. 3 is a rear elevation, the direction of view being indicated by the arrow 3 of Fig. 2.

Fig. 4 is a view similar to Fig. 2, showing the bolt of the catch moved to hood engaging position.

Fig. 5 is a horizontal sectional view taken upon the lines 5—5 of Fig. 4, with the direction of view as indicated.

Fig. 6 is a horizontal sectional view taken upon the line 6—6 of Fig. 4, with the direction of view as indicated.

Specifically describing the preferred embodiment of the invention, it is herein shown as being mounted upon the frame or sill 11 of an automobile 12, to releasably engage the hood 13 thereof to hold the hood 13 closed and against vibration during operation of the automobile. The latch comprises a frame or guide 16 preferably formed from a steel stamping, and comprising side members 17, each of which is provided with a flange 18 at its lower end. The frame 16 is secured to the sill 11 in any convenient manner such as by bolts 19 extending through the flanges 18 and the sill 11; and it is to be observed that the frame 16 is mounted inside or behind the hood 13, whereas it has heretofore been customary to mount these catches outside the hood 13.

The frame 16 inclines upwards and toward the hood 13 as clearly shown upon Figs. 2 and 4. Each of the side bars 17 of the frame 16, is provided with a longitudinally extending slot 21; and a spring seat 22 is guided for movement longitudinally of the frame 16 by having an ear 23 on each side thereof, slidably disposed in one of the slots 21. A coil spring 26 under compression between the spring seat 22 and the top 27 of the frame 16, urges the spring seat 22 downwards toward the sill 11.

A bolt 28 extends through the spring 26 and through a slot in the spring seat 22; and a pin 29 extending through the bolt 28 below the spring seat 22, couples the bolt and seat together, with the result that the action of the spring 26 is to urge the bolt 28 downwards toward the sill 11.

The bolt 28 extends through a slot 31 in the top 27 of the frame 16, and its upper end is enlarged to provide a finger grip 32, an aperture 33 therethrough permitting the user to insert his finger through the grip 32 to facilitate moving the bolt 28.

A shoulder 34 is formed on the back of the bolt 28 in such position that when the bolt 28 is raised and pivoted about the pin 29, toward the back of the slot 31, the shoulder 34 may be engaged upon the top 27 of the frame 16, to prevent the spring 26 from forcing the bolt 28 toward the sill. Preferably the after portion of the top 27 is inclined downwards slightly as at 36, to more securely hold the bolt 28 against inadvertent displacement therefrom.

The finger grip 32 extends through an aperture 41 formed in the hood 13, the parts being so proportioned and arranged that when the bolt 28 is moved downwards, a socket 42 formed in the under surface of the finger grip 32 adjacent the intersection thereof, when the body portion of the bolt 28 will be engaged upon that side 43 of the aperture 41 proximal to the sill 11. It is obvious that when so disposed, the force of the spring 26 will be imposed upon the hood 13, exerting resilient pressure thereupon, holding it in closed position.

Preferably the aperture 41 is of triangular configuration, the side 43 thereof being the base with the apex 44 of the triangle, disposed above the center of the base 43. The purpose of employing an aperture of this shape, is to facilitate moving the hood 13 during closing thereof, so that the finger grips 32 pass through the apertures 41, it being understood that preferably two catches are employed upon each side of the hood 13. Each of the apertures 41 is reinforced by a plate 46 secured to the hood 13, as by rivets 47, with an aperture 48 therein in register with the aperture 41 in the hood 13. The plate 46 is provided with an angular section 49 which is adapted to engage the angular front termination 51 of the socket 42, when the latch is engaged with the hood 13 as clearly shown upon Fig. 4.

Since it is desirable that the lower edges of the hood 13 be permitted a limited degree of longitudinal movement during operation of the automobile, the slot 31 in the top 27 of the frame 16, is wider than the thickness of the bolt 28, permitting a certain degree of lateral movement of the bolt in respect to the frame 16. Thus when the hood 13 moves longitudinally, friction is not set up between the socket 42 and the lowermost edge 43 of each of the apertures 41, as would be the case if the bolt were not permitted this lateral vibration. However, in order to insure that the bolt 28 will be disposed centrally in respect to the frame 16 when in released or elevated position, a guide 52 is provided on the after side of the housing 16 adjacent the top 27 thereof, this guide 52 being provided with a wedge-shaped notch 53 in a flange 54 thereof, which extends forwards over the top 27 in position to engage the bolt 28 as the bolt moves toward the back of the housing 16, and guide the bolt to the center of the housing, it being understood that when the bolt is thus positioned in the center of the housing, it will be automatically brought into register with its associated aperture 41, to facilitate passage of the finger grip 32 through the aperture while the hood is being closed.

The method of operation of the latch of the present invention, is substantially as follows:

Fig. 4 shows the latch in engaging position, i. e., in position to resiliently hold the hood down and impose spring tension thereupon to prevent vibration and rattling thereof. When it is desired to raise the hood to have access to the engine compartment, the operator inserts a finger through the aperture 33, and then lifts upward. The angularity of the finger grip 32 with the body of the bolt, will develop a component force resulting in swinging the bolt 28 inwards, positioning the shoulder 34 upon the portion 36 of the top 27, so that when the operator releases the bolt 28, the spring 26 is not enabled to return the bolt to its lowermost extreme of movement. As a result, the force of the spring 26 is no longer imposed upon the hood 13, and the hood may then be raised by first drawing it outwards slightly to withdraw the finger grips 32 of both catches, from their respective apertures 41, and then lifting the hood upwards.

When it is desired to close the hood, the process is reversed, disposing the finger grips 32 through the apertures 41. Then, by inserting a finger into the aperture 33 of one of the bolts 28, the bolt 28 may be pulled forward, removing the shoulder 34 from the portion 36 of the frame 16, permitting the spring 26 to again force the bolt 28 toward the sill, until the socket 42 of the bolt engages the lowermost edge 43 of the aperture 41. This, of course, is to be done with both catches, so that the tension of both springs 26, is imposed upon the hood 13 to resiliently press it down toward the sill and inwards, pressing the hood firmly against the sides of the radiator and cowl.

It is to be understood that the details of the invention as herein disclosed, are subject to alteration within the spirit or scope of the appended claims.

I claim:

1. A latch for a hood disposed adjacent a sill, comprising a frame secured to said sill behind the hood, a bolt slidably mounted on said frame to reciprocate in a plane inclined to the plane of the hood when in closed position, a portion of said bolt extending through an aperture in said hood spaced from its lower edge, and means carried by the bolt optionally engageable with said hood to secure the hood to the sill.

2. A latch for a hood disposed adjacent a sill, comprising a frame secured to said sill behind the hood, a bolt slidably mounted on said frame, a portion of said bolt extending through an aperture in said hood, and means carried by the bolt optionally engageable with that edge of the aperture proximal to the sill, and means urging the bolt toward the sill.

3. A latch for a hood disposed adjacent a sill, comprising a frame secured to said sill behind the hood, a bolt slidably mounted on said frame, a portion of said bolt extending through an aperture in said hood, and means carried by the bolt optionally engageable with that edge of the aperture proximal to the sill, means urging the bolt toward the sill, and releasable means for holding said engageable means out of engagement with the hood.

4. A latch for a hood disposed adjacent a sill, comprising a frame secured to said sill behind the hood, said frame inclining upwards and outwards toward said hood, a bolt slidably mounted on said frame to reciprocate in a plane inclined to the plane of the hood when in closed position, a finger grip rigid with said bolt and extending through an aperture in the hood spaced from its lower edge, and a spring interposed between said bolt and frame urging said finger grip downwards and inwards against the hood.

5. A latch for a hood disposed adjacent a sill, comprising a frame secured to said sill behind the hood, a bolt slidably mounted on said frame, a finger grip rigid with said bolt and extending through a triangular aperture in the hood, said aperture being disposed with its apex uppermost and the lower side of the aperture being wider than said finger grip, and a spring interposed between said bolt and frame urging said finger grip downwards against the hood.

6. A latch for a hood disposed adjacent a sill, comprising a frame secured to said sill behind the hood, said frame inclining upwards and outwards toward said hood, a bolt slidably mounted on said frame, a finger grip rigid with said bolt and extending through a triangular aperture in the hood, said aperture being disposed with its apex uppermost and the lower side of the aperture being wider than said finger grip, and a spring interposed between said bolt and frame urging said finger grip downwards and inwards against the hood.

7. A latch for a hood disposed adjacent a sill, comprising a frame secured to said sill behind the hood, a bolt mounted for longitudinal sliding movement and lateral vibration in said frame, a finger grip rigid with said bolt and extending through a triangular aperture in the hood, said aperture being disposed with its apex uppermost and the lower side of the aperture being wider than said finger grip, and a spring interposed between said bolt and frame urging said finger grip downwards against the hood.

8. A latch for a hood disposed adjacent a sill, comprising a frame secured to said sill behind the hood, a bolt mounted for longitudinal sliding movement and lateral vibration in said frame, a finger grip rigid with said bolt and extending through a triangular aperture in the hood, said aperture being disposed with its apex uppermost and the lower side of the aperture being wider than said finger grip, a spring interposed between said bolt and frame urging said finger grip downwards against the hood, and means guiding the bolt when moved to releasing position, into register with the center of said aperture.

9. A hood latch comprising a bolt guide disposed within the hood, a bolt mounted for longitudinal sliding movement and lateral vibration in said guide, a finger grip carried by said bolt and extending through an aperture in said hood, and a spring interposed between said bolt and guide urging said finger grip downwards against said hood.

In testimony whereof I have signed my name to this specification.

N. A. SMITH.